(12) United States Patent
Tokarev Sela et al.

(10) Patent No.: US 11,687,553 B2
(45) Date of Patent: Jun. 27, 2023

(54) SYSTEM AND METHOD FOR GENERATING ANALYTICAL INSIGHTS UTILIZING A SEMANTIC KNOWLEDGE GRAPH

(71) Applicant: Sisense Ltd., Ramat Gan (IL)

(72) Inventors: Inna Tokarev Sela, Tel Aviv (IL); Guy Boyangu, Tel Aviv (IL)

(73) Assignee: SISENSE LTD., Ramat Gan (IL)

( * ) Notice: Subject to any disclaimer, the term of this patent is extended or adjusted under 35 U.S.C. 154(b) by 155 days.

(21) Appl. No.: 17/208,620

(22) Filed: Mar. 22, 2021

(65) Prior Publication Data

US 2021/0209125 A1 Jul. 8, 2021

Related U.S. Application Data

(63) Continuation-in-part of application No. 16/876,943, filed on May 18, 2020.

(60) Provisional application No. 63/129,977, filed on Dec. 23, 2020, provisional application No. 62/850,760, filed on May 21, 2019.

(51) Int. Cl.
  *G06F 16/26* (2019.01)
  *G06F 16/2457* (2019.01)
  *G06F 16/901* (2019.01)

(52) U.S. Cl.
  CPC ........ *G06F 16/26* (2019.01); *G06F 16/24578* (2019.01); *G06F 16/9024* (2019.01)

(58) Field of Classification Search
  CPC ........... G06F 16/24578; G06F 16/2477; G06F 16/248; G06F 16/26; G06F 16/285; G06F 16/9024; G06F 16/90328; G06F 17/18; G06F 11/3452; G06N 5/02; G06N 5/022; G06Q 10/06375
  See application file for complete search history.

(56) References Cited

U.S. PATENT DOCUMENTS

| | | |
|---|---|---|
| 6,519,592 B1 | 2/2003 | Getchius et al. |
| 8,412,727 B1 | 4/2013 | Das et al. |
| 9,305,092 B1 | 4/2016 | Finkelstein et al. |
| 9,558,265 B1 | 1/2017 | Tacchi et al. |
| 10,216,860 B2 | 2/2019 | Miranker et al. |
| 10,452,458 B2* | 10/2019 | Seto .............. G06F 11/3409 |
| 10,997,244 B2 | 5/2021 | Russell et al. |
| 2003/0033288 A1 | 2/2003 | Shanahan et al. |
| 2008/0140643 A1 | 6/2008 | Ismalon |
| 2010/0281029 A1 | 11/2010 | Parikh et al. |

(Continued)

*Primary Examiner* — Robert W Beausoliel, Jr.
*Assistant Examiner* — Cheryl M Shechtman
(74) *Attorney, Agent, or Firm* — M&B IP Analysts, LLC

(57) ABSTRACT

A system and method for providing visual data for user interfaces based on a knowledge graph. A method includes identifying at least one second node with respect to a first node based on connections between nodes of a knowledge graph, wherein the knowledge graph includes the first node and the at least one second node, wherein the first node represents a dimension of interest; selecting at least one third node from among the at least one second node by determining a correlation between the first node and each of the at least one second node; determining a new value for a dimension of each of the at least one third node based on a target value such that the correlation of the third node to the first node is maintained while achieving the target value; and generating visual data for an action item user interface based on the new values.

17 Claims, 8 Drawing Sheets

(56) References Cited

U.S. PATENT DOCUMENTS

| | | |
|---|---|---|
| 2013/0218898 A1 | 8/2013 | Raghavan et al. |
| 2013/0226562 A1 | 8/2013 | Arnon |
| 2014/0280307 A1 | 9/2014 | Gupta et al. |
| 2014/0330804 A1 | 11/2014 | Bao et al. |
| 2014/0344265 A1 | 11/2014 | Boucher et al. |
| 2014/0372931 A1 | 12/2014 | Zhai et al. |
| 2015/0169758 A1 | 6/2015 | Assom et al. |
| 2015/0370787 A1 | 12/2015 | Akbacak et al. |
| 2016/0239758 A1 | 8/2016 | Jeong et al. |
| 2016/0267166 A1 | 9/2016 | Kohlmeier et al. |
| 2016/0373456 A1 | 12/2016 | Vermeulen et al. |
| 2017/0068903 A1 | 3/2017 | Hakkani-Tur et al. |
| 2017/0076206 A1* | 3/2017 | Lastras-Montano ............ G06F 16/3344 |
| 2017/0329844 A1 | 11/2017 | Tacchi et al. |
| 2017/0330094 A1 | 11/2017 | Lindsley |
| 2017/0344711 A1 | 11/2017 | Liu et al. |
| 2018/0082183 A1 | 3/2018 | Hertz et al. |
| 2018/0129959 A1* | 5/2018 | Gustafson ............... G06N 20/00 |
| 2018/0137424 A1* | 5/2018 | Gabaldon Royval .. G06N 5/022 |
| 2018/0150750 A1* | 5/2018 | Verdejo ................ G06V 10/84 |
| 2018/0218066 A1 | 8/2018 | Krishnan et al. |
| 2018/0357238 A1* | 12/2018 | Cowan ............... G06F 16/9535 |
| 2019/0057310 A1 | 2/2019 | Olmstead et al. |
| 2019/0087755 A1 | 3/2019 | Hull et al. |
| 2019/0095530 A1 | 3/2019 | Booker et al. |
| 2019/0129961 A1 | 5/2019 | Maiti |
| 2019/0146970 A1 | 5/2019 | Chamieh et al. |
| 2019/0278777 A1 | 9/2019 | Malik et al. |
| 2019/0294732 A1 | 9/2019 | Srinivasan et al. |
| 2019/0324780 A1 | 10/2019 | Zhu et al. |
| 2020/0097560 A1 | 3/2020 | Kulkarni |
| 2020/0117658 A1 | 4/2020 | Venkata et al. |
| 2020/0134492 A1 | 4/2020 | Copeland |
| 2020/0250235 A1 | 8/2020 | Abhyankar et al. |
| 2020/0301953 A1 | 9/2020 | Abhyankar et al. |
| 2020/0372026 A1 | 11/2020 | Hyde et al. |
| 2020/0372373 A1 | 11/2020 | Sela et al. |
| 2020/0409955 A1 | 12/2020 | Sela et al. |
| 2021/0064609 A1 | 3/2021 | Riscutia et al. |
| 2021/0166141 A1 | 6/2021 | Taguchi et al. |
| 2022/0075948 A1 | 3/2022 | Yuan et al. |

* cited by examiner

SYSTEM AND METHOD FOR GENERATING ANALYTICAL INSIGHTS UTILIZING A SEMANTIC KNOWLEDGE GRAPH

CROSS-REFERENCE TO RELATED APPLICATIONS

This application claims the benefit of U.S. Provisional Patent Application No. 63/129,977 filed on Dec. 23, 2020. This application is also a continuation-in-part of U.S. patent application Ser. No. 16/876,943 filed on May 18, 2020, now pending, which claims the benefit of U.S. Provisional Application No. 62/850,760 filed on May 21, 2019. The contents of the above-referenced applications are hereby incorporated by reference.

TECHNICAL FIELD

The disclosure generally relates to business intelligence systems, and particularly to providing ease of use and increasing insights gained from business intelligence systems.

BACKGROUND

Business Intelligence is a field of endeavor which, among other things, attempts to give raw data (e.g., collected measurements) meaning and context which a human user can use to gain insights.

This meaning and context can be realized by, for example, providing visual representations of data. Visual representations may allow humans to identify patterns, or lack thereof, while computer technologies are adept at certain pattern detections, some of which humans would find difficult, if not impossible. Improving the ability to provide insights, store data, and give context, are all advantageous in this field.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for providing visual data for user interfaces based on a knowledge. The method comprises: identifying at least one second node with respect to a first node based on a plurality of connections between nodes of a knowledge graph, wherein the knowledge graph includes the first node and the at least one second node, wherein the first node represents a dimension of interest; selecting at least one third node from among the at least one second node, each of the at least one third node having a respective value, wherein selecting the at least one third node further comprises determining a correlation between the first node and each of the at least one second node, wherein each of the at least one third node is one of the at least one second node for which the determined correlation is above a threshold; determining a new value for a dimension of each of the at least one third node based on a target value, wherein the new value for each third node is determined such that the correlation of the third node to the first node is maintained while achieving the target value; and generating visual data for an action item user interface based on the determined new value for each of the at least one third node.

Certain embodiments disclosed herein also include a non-transitory computer readable medium having stored thereon causing a processing circuitry to execute a process, the process comprising: identifying at least one second node with respect to a first node based on a plurality of connections between nodes of a knowledge graph, wherein the knowledge graph includes the first node and the at least one second node, wherein the first node represents a dimension of interest; selecting at least one third node from among the at least one second node, each of the at least one third node having a respective value, wherein selecting the at least one third node further comprises determining a correlation between the first node and each of the at least one second node, wherein each of the at least one third node is one of the at least one second node for which the determined correlation is above a threshold; determining a new value for a dimension of each of the at least one third node based on a target value, wherein the new value for each third node is determined such that the correlation of the third node to the first node is maintained while achieving the target value; and generating visual data for an action item user interface based on the determined new value for each of the at least one third node.

Certain embodiments disclosed herein also include a system for providing visual data for user interfaces based on a knowledge. The system comprises: a processing circuitry; and a memory, the memory containing instructions that, when executed by the processing circuitry, configure the system to: identify at least one second node with respect to a first node based on a plurality of connections between nodes of a knowledge graph, wherein the knowledge graph includes the first node and the at least one second node, wherein the first node represents a dimension of interest; select at least one third node from among the at least one second node, each of the at least one third node having a respective value, wherein selecting the at least one third node further comprises determining a correlation between the first node and each of the at least one second node, wherein each of the at least one third node is one of the at least one second node for which the determined correlation is above a threshold; determine a new value for a dimension of each of the at least one third node based on a target value, wherein the new value for each third node is determined such that the correlation of the third node to the first node is maintained while achieving the target value; and generate visual data for an action item user interface based on the determined new value for each of the at least one third node.

BRIEF DESCRIPTION OF THE DRAWINGS

The foregoing and other objects, features and advantages will become apparent and more readily appreciated from the following detailed description taken in conjunction with the accompanying drawings, in which.

DETAILED DESCRIPTION

Figure 1:
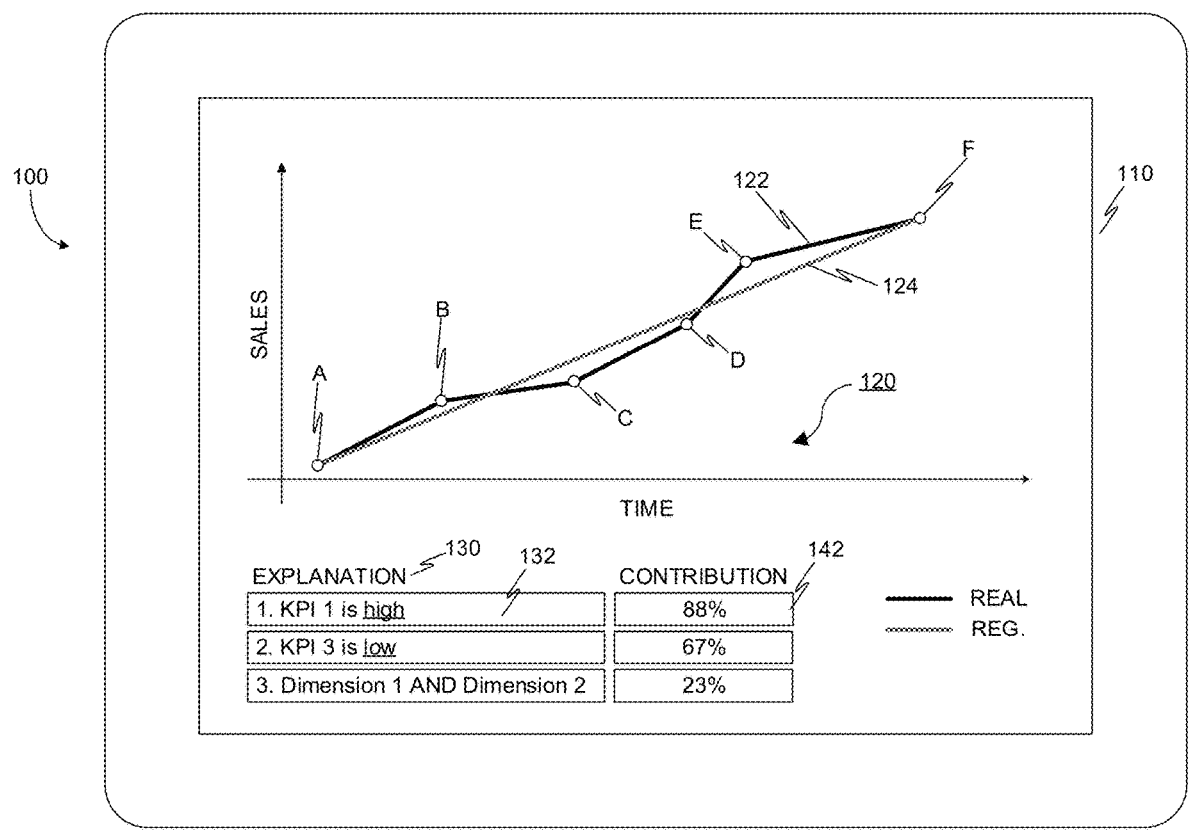
FIG. 1 is a schematic illustration of a user interface showing statistical analysis performed on top of an existing widget and additional dimensions suggested by a Knowledge Graph according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The disclosed embodiments include methods and systems for generating analytical insights using a semantic knowledge graph. According to the disclosed embodiments, a knowledge graph is used for determining dimensions and data which are of interest to a particular user. A first node is selected. The selected first node is correlated with a node representing a dimension of interest. A target value is determined for the dimension of interest. A second value is determined based on the target value and the correlation of the first node with the dimension of interest node. A user interface is caused to be rendered based on the determined second value.

An analysis report is generated based on the dimensions when insights are generated. For example, anomaly detection may indicate that a dimension, which the user may not even be aware of, is affecting a KPI which the user is interested in monitoring. Further, KPIs which should be monitored by the user may be suggested, what-if scenarios may be provided by utilizing predictions and trend detection, and explanations may be provided by determining what other dimensions may impact a monitored KPI, and to what degree such an impact occurs.

FIG. 1 is a schematic illustration of a user interface 100 showing a display 110 rendering a data analysis result according to an embodiment. The display 110 is configured to render an analytics graphical user interface (GUI) with which a user may interact by providing input to a computer device communicating with the display. The analytics GUI may include, for example, a widget. A widget is a graphical representation of data such as, but not limited to, a chart or graph. In the example schematic illustration 100, the widget 120 is a line graph including a first line 122 representing real data and a second line 124 representing a result of a regression analysis performed on the real data.

The first line 122 of the graph represented by the widget 120 includes a plurality of data points A through F in a time series. In other words, the data of point B indicates a time after the data of point A, and so on. As a non-limiting example, the graph may represent total sales as a function of time. By rendering a line between two adjacent data points, a human user may more easily visualize a pattern, in this case, a pattern in which sales are rising, because each subsequent data point has a higher value than the previous data point. This rendering is a "continuous" view of data, which in this case is discrete. However, viewing discrete data points may be more difficult for a human to comprehend than a continuous line.

The second line 124 is rendered based on a result of a regression analysis performed on two or more of the data points of the first line 122. Regression analysis is a useful tool to both gain insight and predict a future trend. In this example, the second line 124 is indicative of a linear function. A user may utilize this knowledge to predict that sales will be at a predicted value at some point in the future and, based on this prediction, other actions may be taken. As non-limiting examples, ensuring stock of an item, ensuring logistical capacity, and the like.

A comparison of the first line 122 and second line 124 may also visually show a user that certain data points may appear anomalous, i.e., they do not conform with the regression. For the purpose of this disclosure, a breakpoint in data is a data point after which the slope of the line decreases, whereas an anomaly is a data point which exceeds the expected value for that point in time by a certain margin. In some embodiments, the margin may be predetermined (e.g., within 0.1 points, or within +−5%), dynamic (e.g., different values at different times), or both (e.g., by shifting between predetermined and dynamically determined values). In this example data point B is a breakpoint, since the slope between A and B is steeper than between B and C, and data point E is an anomaly, since its value is higher than the expected value based on the regression. In some embodiments, a low value may also be indicative of an anomaly.

The display 110 may further include an explanation panel 130. The explanation panel 130 provides insights which are generated by a business intelligence system, such as the insight generator 800 described in more detail below, based on a knowledge graph. Knowledge graph generation is described in more detail in U.S. patent application Ser. No. 16/876,943, assigned to the common assignee, the contents of which are hereby incorporated by reference.

The explanation panel 130 may include one or more explanations such as, but not limited to, explanation 132. Each explanation is associated with one or more data points A through F of the first line 122. Each explanation may further be associated with a contribution (e.g., the contribution 142 which is associated with the explanation 132), which is an indicator of a correlation between the explanation and the one or more data points (i.e., how likely is the explanation to affect the value of the data point).

An explanation 132 may be rendered in response to a user selecting, via the user interface 100, one or more data points for which the user seeks to understand the value of the data point. For example, a user may use an input device, such as a mouse, to click on a data point. The user interface 100 may generate a menu of options the user may select associated with the data point based on the dimensions suggested by the Knowledge Graph. In response to the user selecting "Explanation" by clicking on a portion of the menu having the text "explanation," an explanation panel 130 may be rendered by the user interface 100.

Figure 2:
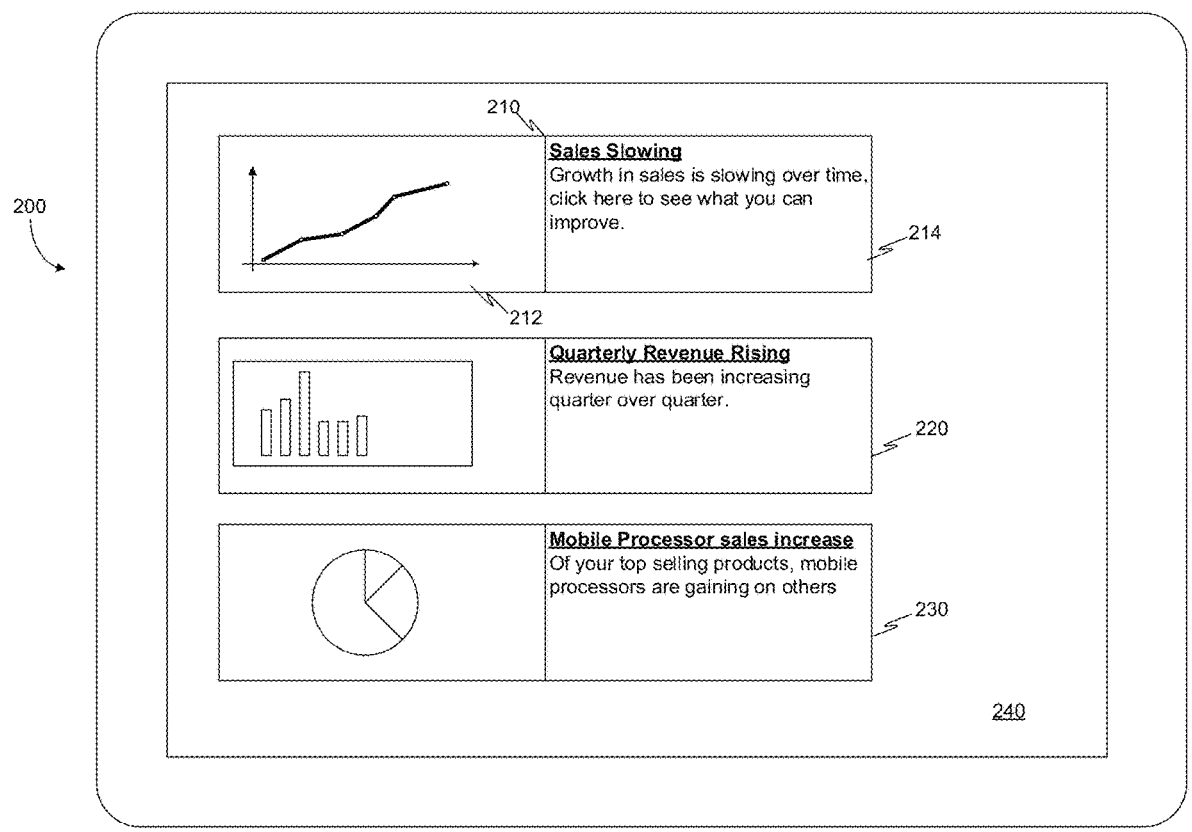
FIG. 2 is a schematic illustration of a user interface for a data analytics report generated based on a knowledge graph according to an embodiment.

FIG. 2 is a schematic illustration of a user interface 200 for a data analytics report generated based on a knowledge graph according to an embodiment. The user interface 200 shows a display 240 including a plurality of insights such as, but not limited to, insights 210, 220, and 230. Each insight 210, 220, or 230 includes a visual representation, such as visual representation 212, and an accompanying text, such as textbox 214. Generation of insights is discussed in more detail below with respect to FIG. 5.

In an embodiment, a plurality of insights may be generated for the user interface 200. An insight may be generated based on an entity represented by a node in a knowledge graph. The entity node may be connected by an edge to a user node (e.g., a node representing a user account). In some embodiments, the knowledge graph may be traversed to locate entity nodes which are not directly connected to a specific user node (i.e., there are one or more other entity nodes or user nodes between the specific user node and the located entity node). A probability may be determined that an entity node is relevant to a user node. The probability may be determined, for example, based on a number of edges connecting the entity node to the user node, a weight of one or more such edges, both, and the like. An insight may be generated, for example, by performing anomaly detection based on an entity node.

In some embodiments the user interface 200 may be configured to receive an input which would cause a secondary user interface (not shown in FIG. 2) to be generated and rendered on the display. For example, clicking (receiving an input from a mouse device when a pointer is at a specific location) on the textbox 214 may cause a user interface 100 such as discussed in FIG. 1 to be rendered on the display instead of the user interface 200.

When a user interacts with an insight via the user interface 200, the interaction may be stored in the knowledge graph, for example by adding to a value of a weight of an edge connecting an insight node with a user node. Thus, a user-specific knowledge graph can be used over time to generate and render for display insights with which the user is more likely to interact. This is desirable as a system with which a user frequently interacts provides clear perceived value to a user.

Figure 3:
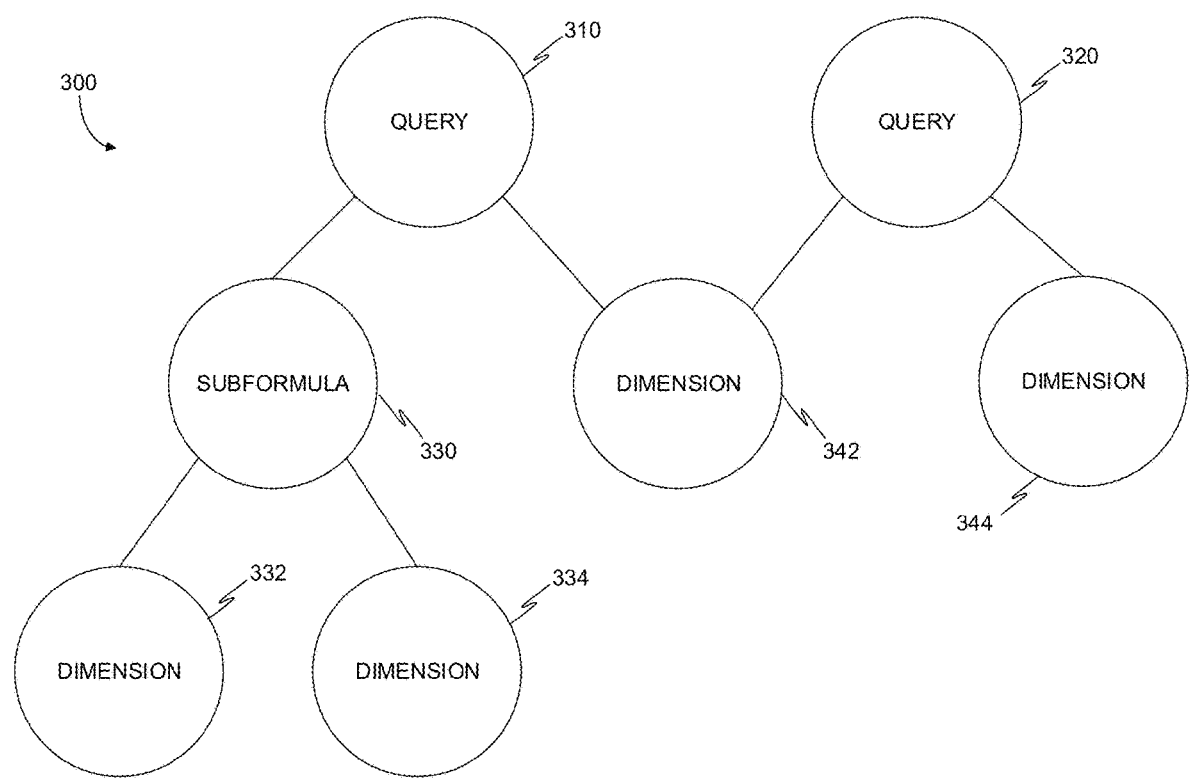
FIG. 3 is a schematic illustration of a knowledge graph according to an embodiment.

FIG. 3 is a schematic illustration of a knowledge graph 300 according to an embodiment. A knowledge graph includes a plurality of nodes, connected to each other via edges. In this example, a first query node 310 is connected to a first subformula node 330 and a first dimension 342. The first subformula node 330 is further connected to a second dimension node 332 and a third dimension node 334. A second query node 320 is connected with the first-dimension node 342, and a fourth dimension node 344.

A query node (e.g., the query node 310 or 320) represents a specific query, which may include subformulas (represented by subformula nodes), dimensions (represented by dimension nodes), measures (represented by measure nodes, not shown here), and the like.

An edge connecting two nodes may be further associated with a weight, which is a value indicating the strength of the relationship between these two nodes. In an embodiment, the relation strength may be represented by a probability two nodes will be used together.

For example, the first dimension 342 may have an equal probability (assuming weights are identical) to appear as part of the first query or the second query, as the first dimension is connected to both.

In the following example, a query associated with query node 310 is executed multiple instances, at different time intervals, generating results (data points A through F) which are a time series. In some embodiments, the query node 210 may be executed once as a GROUP-BY query, with the results parsed.

A user may request an explanation to determine why a certain data point has a value which is not the expected value (i.e., values which are derived from a regression function). A knowledge graph may be traversed to determine what nodes to analyze to determine which ones of them affect the query, and in some embodiments, the degree to which they affect (e.g., linear effect).

For example, a connection may be determined between two or more nodes. Additional queries may be executed in order to determine the connection. As a non-limiting example, the fourth dimension represented by the fourth dimension node 344 may be determined to be related to the query represented by the query node 310 since there is an edge connecting query node 310 to the first dimension node 342, which in turn is connected to the second query node 320, which in turn is connected to the fourth dimension node 344.

A correlation-type connection may be determined between results of the query 310 and values of the dimension 344. A confidence level may be determined, for example, by generating a score based on the weights assigned to the edges between the query node 310 and the fourth dimension 344.

Figure 4:
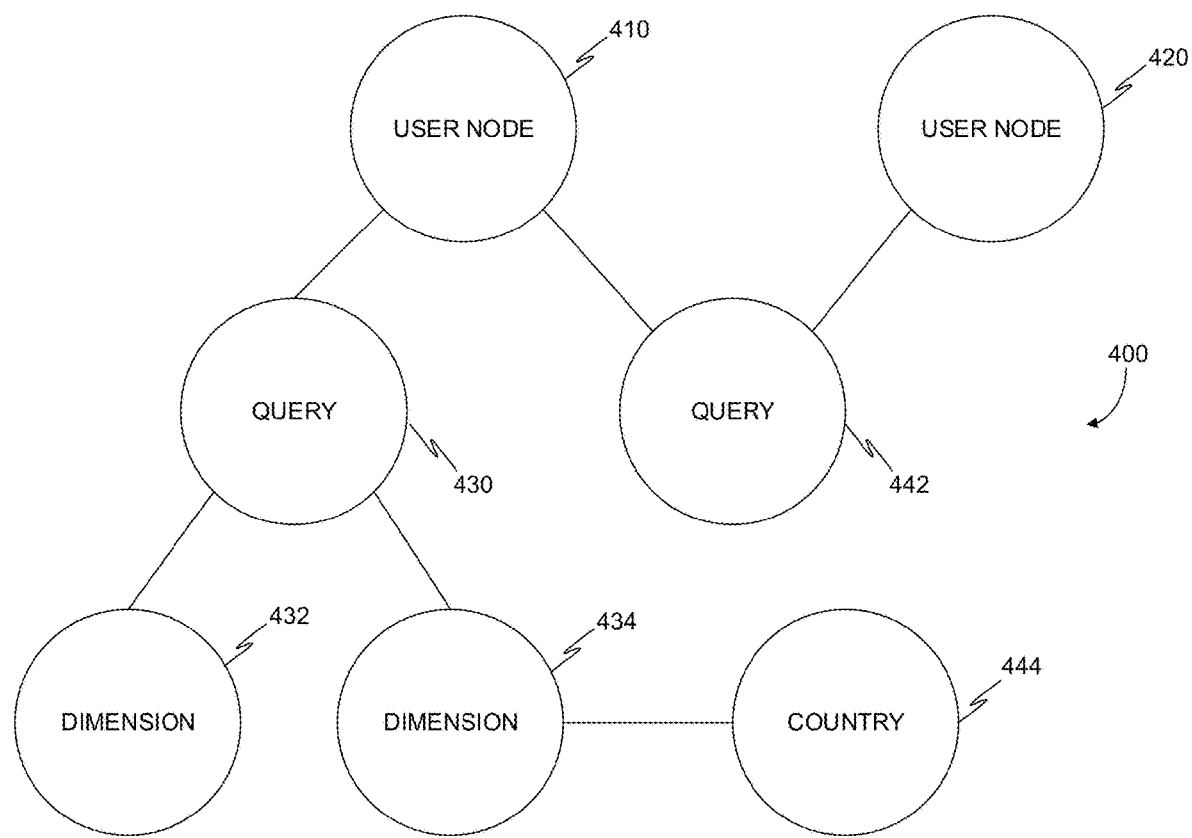
FIG. 4 is a schematic illustration of another knowledge graph according to an embodiment.

FIG. 4 is a schematic illustration of another knowledge graph 400 according to an embodiment. Each user of the knowledge graph 400 is associated with a respective user node such as a first user node 410 and a second user node 420. A user node represents a user account which is associated with a unique user. A user node may include attributes, keywords, tags, and metadata indicating information, such as, but not limited to, name, position, email, combinations thereof, and the like. A user node may be connected with a plurality of object nodes, such as a first query node 430, and a second query node 442.

The first query node 430 is connected with a first dimension node 432 and a second dimension node 434. Query nodes may be used to generate insights (such as discussed in FIG. 3 above), for example by determining dimensions being queried by a user. It may be assumed that a user is querying regarding dimensions in which they are interested, therefore insights which are related to such dimensions would be of interest.

As another example, the second user node 420 shares the second query node 442 with the first user node 410. A system (e.g., the insight generator 800, FIG. 8) may be configured to generate an insight for the second user node 420 based on the first query, of which the second user node 420 may not be aware.

Certain nodes in the knowledge graph, such as country node 444, may be used to filter suggestions and insights. For example, it may be determined that only users who share country nodes (i.e., are connected directly or indirectly to the same country node) may suggest queries to each other.

Figure 5:
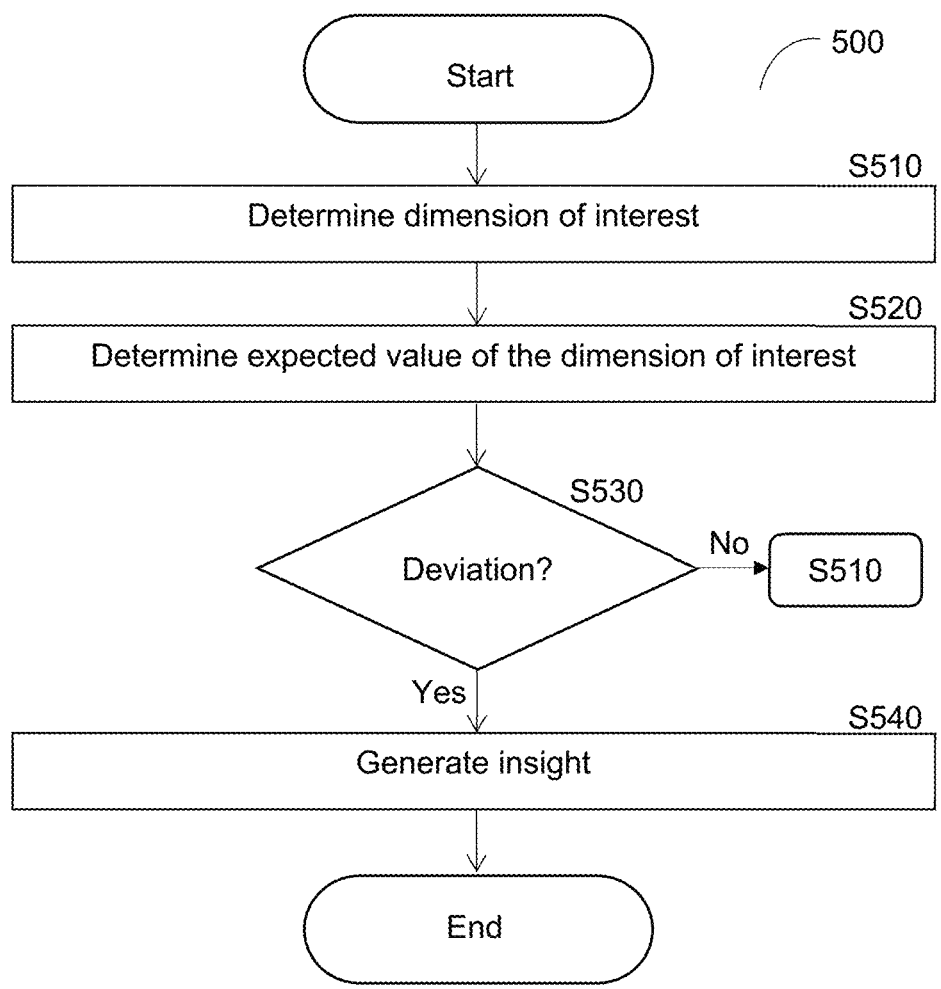
FIG. 5 is a flowchart illustrating a method for generating personalized insights based on a knowledge graph according to an embodiment.

FIG. 5 is a flowchart 500 illustrating a method for generating personalized insights based on a knowledge graph according to an embodiment. In an embodiment, the method is performed by a business intelligence system such as the insight generator 800, FIG. 8.

At S510, a dimension of interest is selected by the system for a user. In an embodiment, the dimension of interest is selected from a predetermined list of dimensions such as, but not limited to, dimensions which are connected to query nodes connected with a user node of the user. It should be noted that multiple dimensions of interest may be selected.

In some embodiments, a dimension of interest is selected from the knowledge graph by selecting a node from the knowledge graph. As a non-limiting example, a node connected directly or indirectly to the user node by edges having a combined weight which exceeds a certain value may be selected.

A direct connection exists between a first node and a second node when the first node and the second node are connected by one edge. An indirect connection exists between a first node and a second node when the first node is connected to one or more intermediate nodes, and one or more of the intermediate nodes is connected to the second node.

In certain embodiments, a dimension of interest may be determined by generating a correlation between a first node and one or more additional nodes which are connected directly or indirectly to the user node. As a non-limiting example, a user may be receiving reports on a first dimension based on a first query. A correlation may be determined to exist between the first dimension node and a second dimension node which is not associated with the user node. In other words, the user has not initiated any query which generates an output based on the second dimension. By generating an insight based on the second dimension, the user is provided with added value from the system.

At S520, an expected value of the dimension of interest is determined. The expected value may be determined, for example, by performing a regression analysis on values of the dimension over time such that the expected value is the value output by the regression function at a given point in time.

At S530, a check is performed to compare the expected value with an actual value in order to determine whether there is a deviation. The result of the comparison may be determined to be significant or not. In an embodiment, a result of the comparison is significant when the difference between the values is above a predetermined threshold value or proportion, is greater than or less than a predetermined statistical factor (e.g., a predetermined number of standard deviations above or below an average value), a combination thereof, and the like. In a further embodiment, the comparison may be between values from the same time period, values from the same day(s) in different years, and the like. As a non-limiting example, sales may decrease dramatically within a day, after a month-long rise. However, if this day is December 26th, then by generating a new expected value, based on annually recurring data, as opposed to comparing to data from the previous weeks leading up to, then the determination may be that the numbers are indeed within an expected value. If there is no statistically significant deviation from the expected value, execution continues at S510 where monitoring for subsequent deviations may resume; otherwise, execution continues at S540.

At S540, an insight is generated. In an embodiment, S540 includes generating an insight node and integrating the insight node into a semantic knowledge graph. An integrated insight node is connected to a widget node and an explanation node in the semantic knowledge graph. Generation of explanation nodes is explained in more detail above with respect to FIG. 1 and below with respect to FIG. 7. The insight may be generated as part of a display rendered via a user interface through which a user may interact by providing input thereto.

In an embodiment, a graphical representation of the widget node may be selected by selecting a query node from the knowledge graph such that the query node is associated with a similar widget node, and the graphical representation is selected based on the attributes of the similar widget node.

In some embodiments, a knowledge graph ranking module may rank a plurality of entity nodes with respect to a first node, such as a first user node. Ranks may be based, for example, on a number of edges, weight of edges, a distance between nodes (number of intermediate nodes in between a first and second node), matching metadata, combinations thereof, and the like.

The system may select one or more dimensions of interest based on the rank generated by the ranking module. The system may execute one or more of a plurality of analyses such as, but not limited to, anomaly detection, forecasting, and the like, based on the one or more selected dimensions. Results of the analyses are checked to determine if any values exceed predetermined thresholds. For example, the system may forecast that a dimension is expected to have a certain value, which exceeds normal values (e.g., values within 3 sigma). A notification may then be generated to point the user to this data, and possibly provide an explanation as detailed herein.

Figure 6:
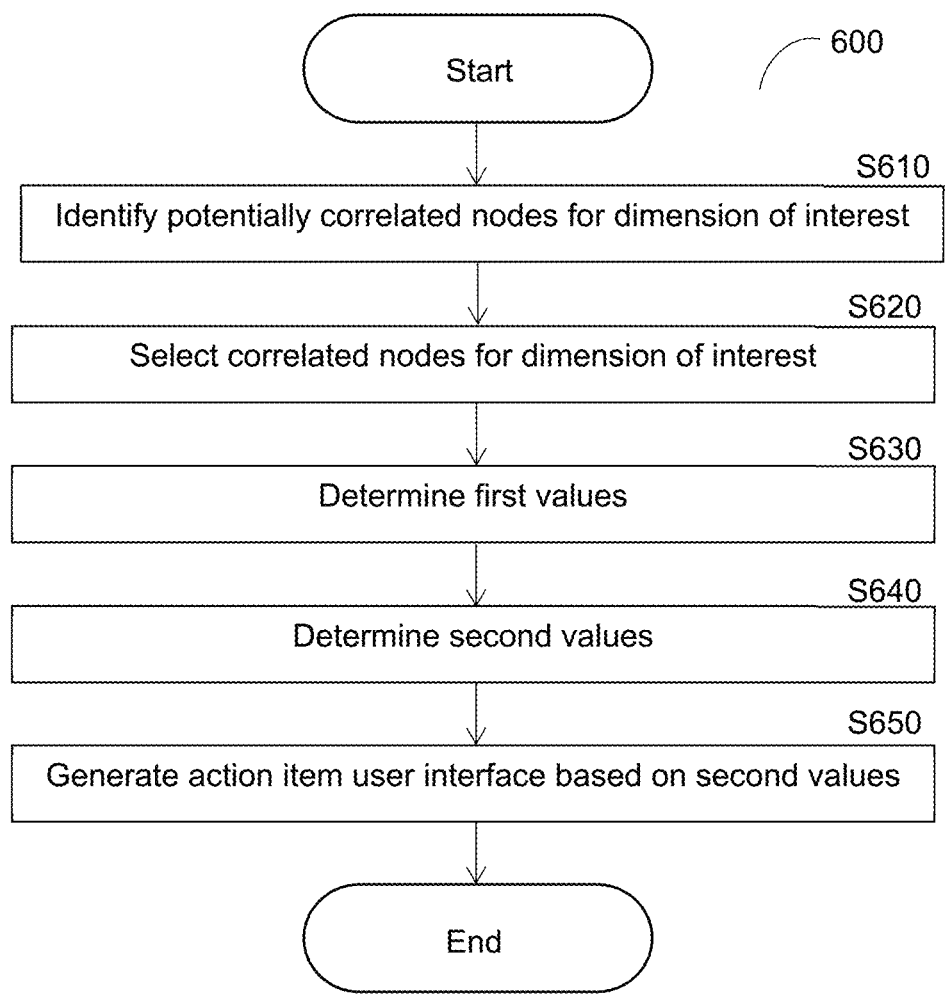
FIG. 6 is a flowchart illustrating a method for generating an action item for an insight according to an embodiment.

FIG. 6 is a flowchart 600 illustrating a method for generating an action item user interface for an insight according to an embodiment. In an embodiment, the method is performed by a business intelligence system such as the insight generator 800, FIG. 8. The insight may be generated according to the method described above in FIG. 5.

At S610, one or more second potentially correlated nodes are identified in a knowledge graph with respect to a first dimension of interest node. The first dimension of interest node represents a dimension of interest, for example, a node associated with a dimension of interest determined as described above with respect to FIG. 5.

In an embodiment, the potentially correlated nodes are identified based on connections between nodes of the knowledge graph. More specifically, nodes connected either directly or indirectly to the dimension of interest node may be analyzed in order to identify the potentially correlated nodes. The analysis may be based on edges between nodes and, in particular, based on a number of edges between nodes, whether the connection is direct or indirect, a strength of relationship represented by each edge, a combination thereof, and the like.

Using the knowledge graph in order to identify potentially correlated nodes prior to selecting correlated nodes improves computer performance by reducing the number of calculations and, therefore, the computing resources used for such calculations. Accordingly, the identification of potentially correlated nodes based on connections represented by edges allows for reducing the number of nodes for which statistical analyses need to be performed, thereby conserving computing resources.

In this regard, it is noted that this filtering of nodes by identifying potentially correlated nodes before selecting correlated nodes allows for more efficiently selecting correlated nodes than existing solutions such as, for example, solutions using online analytical processing (OLAP) cubes. Selecting correlated nodes using an OLAP cube would require determining correlations between every two columns in the OLAP cube, even when many of those potential column comparisons are not likely to yield relevant results. Identifying potentially correlated nodes using edges available by virtue of a knowledge graph allows for performing a reduced processing filtering step prior to determination of correlations.

At S620, one or more third correlated nodes are selected from among the potentially correlated nodes. The selected third nodes are correlated with the dimension of interest node. Correlation may be determined by selecting one or more nodes from a knowledge graph and performing a statistical analysis between the dimensions of the dimension of interest node and the potentially correlated nodes. More specifically, the correlation may be determined using techniques known in the art based on expected values, covariance, and standard deviation. The expected value, in turn, is determined by performing a regression analysis to produce a regression function, where the value of the regression function at any given point is the expected value for that point. Each correlated node may be selected having a positive or negative correlation, and in some embodiments, the correlation should be at or exceed a predetermined value.

At S630, a target value of the dimension of interest node correlated with each correlated node is determined. In an embodiment, the target value is an expected value. In other embodiments, the target value may be received as an input from a user. For example, the target value may be a 5% increase in sales, or a 2% decrease in customer churn. An expected value may be generated based on determining a trendline, for example using a regression analysis as described above.

At S640, a second value is determined for a dimension of each correlated node based on the target value. For example, a 5% increase in sales may be achieved by performing a 7% reduction in price. The second value may be determined based on the target value and the correlation of the first node with the dimension of interest node. More specifically, determining the second value may include solving a correlation equation for the second value such that the correlation of the first node is maintained while achieving the target value.

At S650, visual data for an action item user interface is generated, and the action item user interface is rendered or caused to be rendered based on the determined second value. The action item user interface may be rendered as part of the rendered insights. For example, an insight may be that sales are decreasing. In order to increase sales by 5%, the user should take the action of decreasing price by 7%. In an embodiment, an insight may be generated as described above with respect to FIG. 5.

Figure 7:
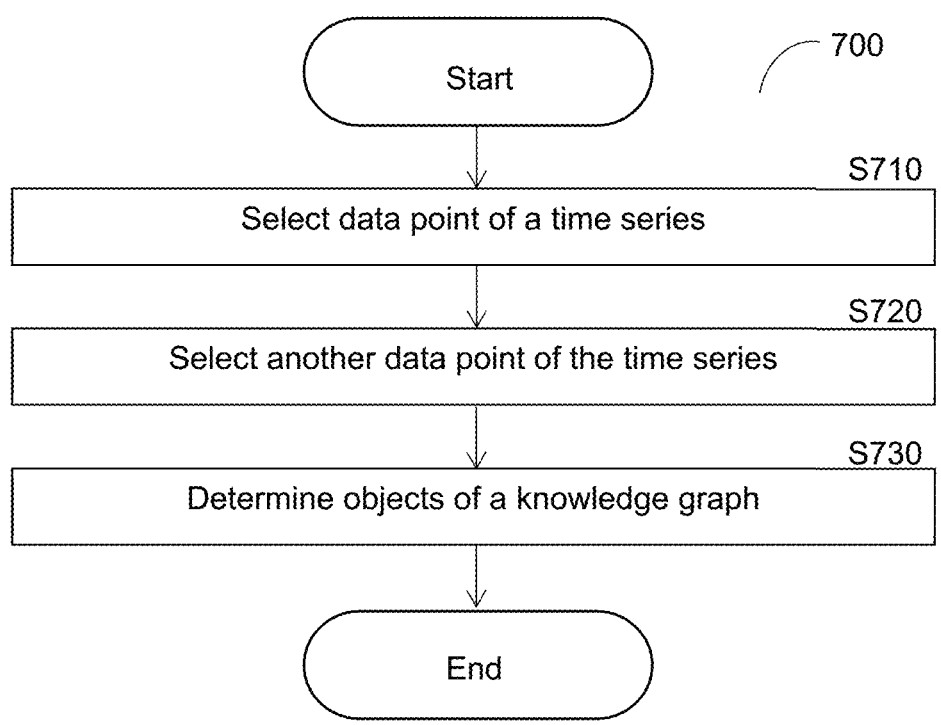
FIG. 7 is a flowchart illustrating a method for determining a cause in unexpected data value according to an embodiment.

FIG. 7 is a flowchart 700 illustrating a method for determining a cause in unexpected data value according to an embodiment. In an embodiment, the method is performed by a business intelligence system such as the insight generator 800, FIG. 8.

At S710, a data point is selected from a time series of data points. The data point is a result of executing a query on a data set. A data point may be selected by receiving an input through a user device having an input device and a display on which a graphical user interface is generated.

At S720, another data point is selected from the time series of data points. The data point may be selected automatically or received as a user input. A user may select another data point as a data point which is displayed as part of the rendered widget, or may select a data point from any point in time at which data is available. In an embodiment, the user may select a plurality of data points. In some embodiments, data points are selected automatically, for example, by selecting the data point immediately preceding and immediately succeeding the data point selected at S710.

At S730, one or more impact nodes are determined from the knowledge graph. The impact nodes are nodes which are determined as likely to affect the value represented by the selected data points. For example, a knowledge graph such as presented above may be traversed to determine which nodes may affect query results. Such nodes may be selected, for example, based on scores associated with the edges between the query node from which the data point results, to one or more other object nodes (such as discussed above).

In some embodiments, a confidence score may be further calculated. The confidence score may be a measure of the probability that the node has affected the value of the data point. In the example presented above in FIG. 2, a second query is identified, the second query having a fourth dimension which is not directly related to the first query. A BI system may execute the second query to generate one or more corresponding results, so that a data point from the first query corresponds in time to a data point of the second query. A BI system may then determine if a correlation exists between the data points of the first query and the data points of the second query. The result of the correlation may be used to determine a confidence score. The confidence scores may be utilized to determine which nodes are impact nodes, for example, such that impact nodes are nodes for which the determined confidence scores are above a threshold.

Figure 8:
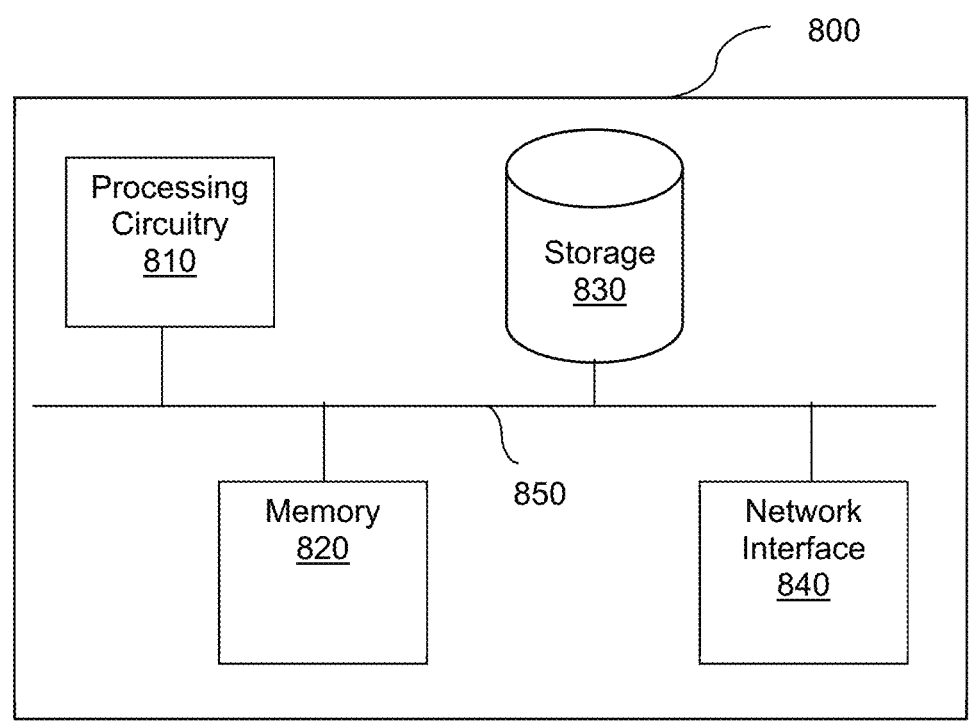
FIG. 8 is a schematic diagram of an insight generator according to an embodiment.

FIG. 8 is an example schematic diagram of an insight generator 800 according to an embodiment. The insight generator 800 includes a processing circuitry 810 coupled to a memory 820, a storage 830, and a network interface 840. In an embodiment, the components of the insight generator 800 may be communicatively connected via a bus 850.

The processing circuitry 810 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 820 may be volatile (e.g., random access memory, etc.), non-volatile (e.g., read only memory, flash memory, etc.), or a combination thereof.

In one configuration, software for implementing one or more embodiments disclosed herein may be stored in the storage 830. In another configuration, the memory 820 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 810, cause the processing circuitry 810 to perform the various processes described herein.

The storage 830 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 840 allows the insight generator 800 to communicate for purposes such as sending and receiving data over a network (not shown).

It should be understood that the embodiments described herein are not limited to the specific architecture illustrated in FIG. 8, and other architectures may be equally used without departing from the scope of the disclosed embodiments.

Throughout this disclosure, the term "rendered" is used to indicate that instructions are generated and performed by a processor to render a graphical element.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

The invention claimed is:

1. A method for providing visual data for user interfaces based on a knowledge graph, comprising:
identifying at least one second node with respect to a first node based on a plurality of connections between nodes of a knowledge graph, wherein the knowledge graph includes the first node and the at least one second node, wherein the first node represents a dimension of interest;
selecting at least one third node from among the at least one second node, each of the at least one third node having a respective value, wherein selecting the at least one third node further comprises determining a correlation between the first node and each of the at least one second node, wherein each of the at least one third node is one of the at least one second node for which the determined correlation is above a threshold;
determining a new value for a dimension of each of the at least one third node based on a target value, wherein the new value for each third node is determined such that a correlation of the third node to the first node is maintained while achieving the target value; and
generating visual data for an action item user interface based on the determined new value for each of the at least one third node; and wherein
determining the new value for each third node further comprises:
selecting a first data point from a time series including a plurality of data points, the first data point corresponding to the third node;
selecting a second data point from the time series, wherein the second data point is selected from a point in time which is different from a point in time of the first data point; and
determining the new value based on the knowledge graph, the third node, and the second data point.

2. The method of claim 1, further comprising:
determining the target value, wherein determining the target value further comprises performing a regression analysis to produce a regression function, wherein the target value is a value of the regression function.

3. The method of claim 1, wherein the knowledge graph further includes a plurality of dimension nodes, wherein identifying the at least one second node further comprises:
generating a rank value for each of the plurality of dimension nodes; and
identifying the second node from among the plurality of dimension nodes such that the second node has a rank value above a threshold.

4. The method of claim 3, wherein the rank value for each of the plurality of dimension nodes is generated based on at least one of: a number of edges between the dimension node and a corresponding user node, and a weight assigned to an edge between the dimension node and a corresponding user node.

5. The method of claim 3, wherein determining the correlation between the first node and one of the at least one second node further comprises:
performing a regression analysis between the first node and the second node in order to determine an expected value, wherein the correlation is determined based on the expected value.

6. The method of claim 5, wherein the correlation between the first node and one of the at least one second node is determined based further on a covariance and a standard deviation calculated for the first node and the second node.

7. The method of claim 1, wherein determining the new value for each third node further comprises:
identifying at least one impact node in the knowledge graph, wherein each impact node is determined to likely affect the first data point and the second data point, wherein the new value is determined based further on the identified at least one impact node.

8. The method of claim 7, wherein identifying the at least one impact node further comprises:
generating a confidence score for each of a plurality of nodes of the knowledge graph, wherein each of the at least one impact node has a confidence score above a threshold.

9. A non-transitory computer readable medium having stored thereon instructions for causing a processing circuitry to execute a process, the process comprising:
identifying at least one second node with respect to a first node based on a plurality of connections between nodes of a knowledge graph, wherein the knowledge graph includes the first node and the at least one second node, wherein the first node represents a dimension of interest;
selecting at least one third node from among the at least one second node, each of the at least one third node having a respective value, wherein selecting the at least one third node further comprises determining a correlation between the first node and each of the at least one second node, wherein each of the at least one third node is one of the at least one second node for which the determined correlation is above a threshold;
determining a new value for a dimension of each of the at least one third node based on a target value, wherein the new value for each third node is determined such that a correlation of the third node to the first node is maintained while achieving the target value; and
generating visual data for an action item user interface based on the determined new value for each of the at least one third node; and wherein
determining the new value for each third node further comprises:
selecting a first data point from a time series including a plurality of data points, the first data point corresponding to the third node;
selecting a second data point from the time series, wherein the second data point is selected from a point in time which is different from a point in time of the first data point; and
determining the new value based on the knowledge graph, the third node, and the second data point.

10. A system for providing visual data for user interfaces based on a knowledge graph, comprising:
a processing circuitry; and
a memory, the memory containing instructions that, when executed by the processing circuitry, configure the system to:
identify at least one second node with respect to a first node based on a plurality of connections between nodes of a knowledge graph, wherein the knowledge graph includes the first node and the at least one second node, wherein the first node represents a dimension of interest;
select at least one third node from among the at least one second node, each of the at least one third node having a respective value, wherein selecting the at least one third node further comprises determining a correlation between the first node and each of the at least one second node, wherein each of the at least one third node is one of the at least one second node for which the determined correlation is above a threshold;
determine a new value for a dimension of each of the at least one third node based on a target value, wherein the new value for each third node is determined such that a correlation of the third node to the first node is maintained while achieving the target value;
generate visual data for an action item user interface based on the determined new value for each of the at least one third node;
select a first data point from a time series including a plurality of data points, the first data point corresponding to the third node;
select a second data point from the time series, wherein the second data point is selected from a point in time which is different from a point in time of the first data point; and
determine the new value based on the knowledge graph, the third node, and the second data point.

11. The system of claim 10, wherein the system is further configured to:
determine the target value, wherein determining the target value further comprises performing a regression analysis to produce a regression function, wherein the target value is a value of the regression function.

12. The system of claim 10, wherein the knowledge graph further includes a plurality of dimension nodes, wherein the system is further configured to:
generate a rank value for each of the plurality of dimension nodes; and
identify the second node from among the plurality of dimension nodes such that the second node has a rank value above a threshold.

13. The system of claim 12, wherein the rank value for each of the plurality of dimension nodes is generated based on at least one of: a number of edges between the dimension node and a corresponding user node, and a weight assigned to an edge between the dimension node and a corresponding user node.

14. The system of claim 12, wherein the system is further configured to:
perform a regression analysis between the first node and the second node in order to determine an expected value, wherein the correlation is determined based on the expected value.

15. The system of claim 14, wherein the correlation between the first node and one of the at least one second node is determined based further on a covariance and a standard deviation calculated for the first node and the second node.

16. The system of claim 10, wherein the system is further configured to:
identify at least one impact node in the knowledge graph, wherein each impact node is determined to likely affect the first data point and the second data point, wherein the new value is determined based further on the identified at least one impact node.

17. The system of claim 16, wherein the system is further configured to:
generate a confidence score for each of a plurality of nodes of the knowledge graph, wherein each of the at least one impact node has a confidence score above a threshold.

* * * * *